United States Patent
Lindström et al.

[11] Patent Number: 6,008,455
[45] Date of Patent: Dec. 28, 1999

[54] METHOD AND ARRANGEMENT FOR MINIMIZING SKEW

[75] Inventors: Bengt Lindström, Älta; Hans-Christer Moll, Enskede; Odd Steijer, Bromma, all of Sweden

[73] Assignee: Telefonaktiebolaget LM Ericsson, Stockholm, Sweden

[21] Appl. No.: 08/786,737

[22] Filed: Jan. 27, 1997

[30] Foreign Application Priority Data

Jan. 26, 1996 [SE] Sweden .................................. 9600293

[51] Int. Cl.⁶ ...................................................... H01B 7/08
[52] U.S. Cl. ........................ 174/117 F; 174/36; 714/700; 714/712; 714/797
[58] Field of Search ........................... 174/117 F, 117 M, 174/36; 370/503; 714/700, 712, 797

[56] References Cited

U.S. PATENT DOCUMENTS

| | | | |
|---|---|---|---|
| 2,628,998 | 2/1953 | Frisbie | 174/112 |
| 4,381,420 | 4/1983 | Elliott et al. | 174/36 X |
| 4,392,199 | 7/1983 | Schmitter et al. | 364/200 |
| 4,472,598 | 9/1984 | Boyd et al. | 174/117 F X |
| 4,700,347 | 10/1987 | Rettberg et al. | 371/1 |
| 4,818,820 | 4/1989 | LaRock | 174/36 |
| 4,879,433 | 11/1989 | Gillett et al. | 174/32 |
| 5,025,115 | 6/1991 | Sayegh et al. | 174/117 F |
| 5,162,611 | 11/1992 | Nichols, III et al. | 174/36 |
| 5,245,134 | 9/1993 | Vana, Jr. et al. | 174/117 F |
| 5,389,741 | 2/1995 | Ueno | 174/117 F |
| 5,768,283 | 6/1998 | Chaney | 370/503 X |

*Primary Examiner*—Kristine Kincaid
*Assistant Examiner*—Chau N. Nguyen
*Attorney, Agent, or Firm*—Burns, Doane, Swecker & Mathis, L.L.P.

[57] ABSTRACT

At a signal transmission rate of 1 Gb/s, the "bit time" is 1 ns. This corresponds to a bit length in an optical fibre of 0.2 m. In view of the fact that skew shall not exceed one-tenth of a bit length, this means that length differences between different conductors in a transmission line may not exceed 2 cm. With the intention of minimizing the skew that would thus otherwise occur in a transmission line, the transmission line (1) and its conductors (2) have been joined to form a ribbon cable or flat cable where the length difference (5) between different conductors (2) in the transmission line does not exceed 2 cm. By providing transmission lines, such as rolled-up flat ribbon cables for instance, which have been previously cut to precise and appropriate lengths, such as lengths of 10, 20, 30 m for instance, with a largest length deviation between different conductors of ±1 cm, skew can be minimized when using the cables. By conductor is primarily meant an optical fiber, although other conductors such as coaxial conductors or twin wire conductors are conceivable. Since the three fibres are seated together along the major part of their lengths, they can be readily laid in an installation, which is an advantage in many types of installations, and the cable parts can be easily drawn apart and laid individually. With a guaranteed greatest length deviation of ±1 cm of each fibre, skew can be controlled and more reliable signal transmission made possible with the aid of a majority decision.

8 Claims, 2 Drawing Sheets

METHOD AND ARRANGEMENT FOR MINIMIZING SKEW

FIELD OF INVENTION

The present invention relates to a method and to an arrangement for minimizing skew so as to obtain a low bit error rate when transmitting signals at a high transmission rate. Low bit error rates are required in digital transmission links in a switching core of a telecommunications switching centre or exchange, for instance.

DESCRIPTION OF THE BACKGROUND ART

The demand for "faultless" signal transmission in the field of telecommunications is very high in certain cases. For instance, in the aforesaid digital transmission links of a switching core of a telecommunications switching centre or exchange the bit error rate (BER) must be extremely low.

Reliability can be further improved by tripling the transmission, wherein three separate links are used, with each link transmitting the same information. By mutually comparing the signals/bits received on the three links and applying the majority decision, it is often possible to sort out the majority of occurrent bit errors when the three sets of received information are not identical.

However, it is necessary for the three signals to arrive simultaneously at the point at which the majority decision shall be taken. However, the requirement of exact simultaneity may be difficult to achieve for several reasons. The time deviation or so-called skew in parallel signal transmissions can occur in the electronic components and also in the signal transmission lines. Skew in electronic components can be minimized by suitable construction of the components.

SUMMARY OF THE INVENTION

The "bit time" at a signal transmission rate of 1 Gb/s is 1 ns. This corresponds to a bit length in an optical fibre of 0.2 m. When skew shall not be allowed to exceed one-tenth of a bit length, this implies that length differences between different conductors in a transmission line may not exceed 2 cm. Thus, in order to minimize the skew that may occur in a transmission line, the transmission line and its conductors have been connected/cabled three and three as a ribbon or flat cable, where the length differences between the various conductors in the transmission line do not exceed 2 cm. By providing transmission lines, such as rolled-up flat ribbon cables, which have been cut into precise, appropriate lengths, such as 10, 20, 30 m for instance, with a greatest length deviation between different conductors of ±1 cm, the skew can be minimized when using the cables. By conductor is meant in the present case primarily an optofibre, although other conductors such as coaxial conductors or twin-wire conductors are also conceivable.

For instance, when connectors are to be fitted onto the ends of the fibres in a transmission line, the transmission line is first cut essentially at right angles to its longitudinal axis into an appropriate length at which the length deviation between the individual fibres will be negligible, wherein the total length of the individual fibres is not critical but solely the deviation between the fibres, this deviation having been predetermined to a maximum value. The three fibres in the transmission line are then mutually separated along a short distance from the ends of the line and coupled to the devices intended. Subsequent to connecting the fibres, the cable is qualified with regard to the mutual placement of the connectors, which can be effected very easily and compared with a control measurement of three separate connector-fitted cables. To facilitate separation of the different conductors, or fibres, they may be provided with different identifying notations, signs and/or different colours. When the three fibres are seated together along the major part of their lengths, they can readily be placed together in an installation, which is advantageous in the case of large installations, and the cable parts can also be easily separated so as to enable said parts to be positioned individually. With a guaranteed greatest length deviation of ±1 cm of each fibre, skew can be controlled and therewith make possible more reliable signal transmission with the aid of a majority decision.

DETAILED DESCRIPTION OF PREFERRED EMBODIMENTS

Figure 1:
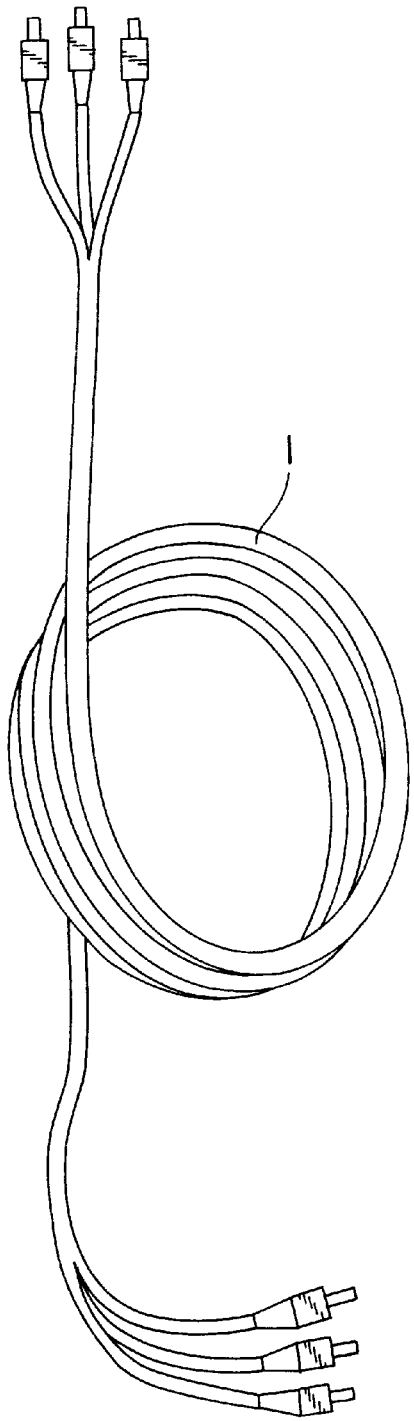
FIG. 1 illustrates a three-fibre cable provided with contacts and having a given total length in accordance with the invention.
Figure 2:
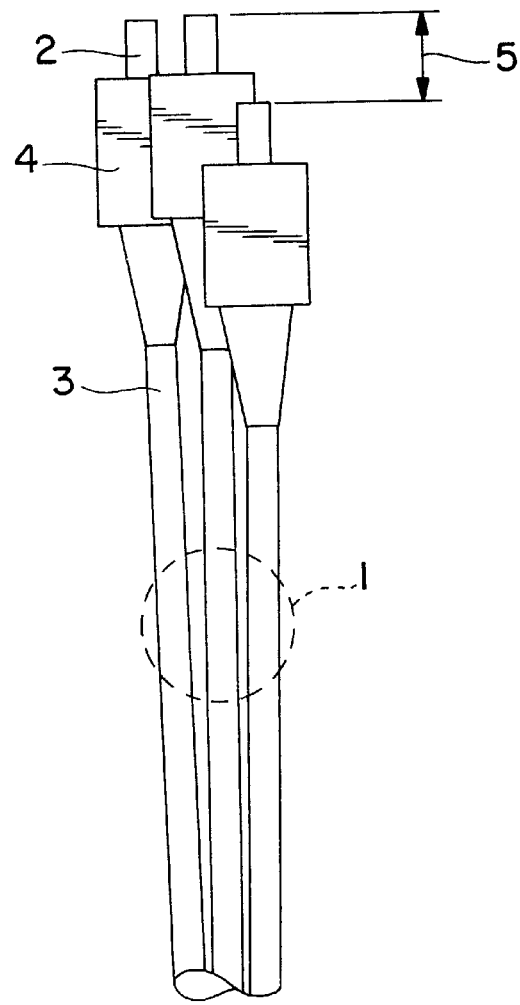
FIG. 2 illustrates one end of the three-fibre cable illustrated in FIG. 1, and shows the deviation in lengths of the contact equipped fibres.

FIGS. 1 and 2 illustrate a conceivable arrangement of a ribbon cable or flat cable 1 which includes optic fibres 2. Each fibre is embraced by an insulating and protecting sheath 3 and may be provided with connectors 4 at both end of the fibre, as illustrated. The three different sheath 3 of the ribbon cable 1 are mutually joined such that a centre sheath is joined with two outer sheaths and therewith form a ribbon cable, or flat cable. When manufacturing the ribbon cable, the three mutually adjacent fibres having mutually the same length may be arranged in their respective sheaths and the sheaths then joined together. This enables flat three-fibre cables to be provided in various lengths, for instance lengths of about 10, 15, 20 or 25 m in which each fibre has an absolute length accuracy smaller than ±1 cm, wherein a deviation 5 of at maximum, e.g., 1 cm/side can be measured and the skew/time deviation would not need to exceed one-tenth of a bit slot at 1 Gb/s. When connectors are to be fitted on the ends of the fibres, an appropriate length of the three-fibre cable is first removed. This will result in a negligible length deviation between the fibres. The three sheathed fibres are then separated along a short length from the cable ends and the connectors fitted to said fibres. Subsequent to fitting the connectors, the cable is qualified with regard to the mutual positioning of the connectors, which can be readily achieved. Alternatively, the manufacture of flat cables of specific lengths and provided with connectors at their respective ends may be fully automated, wherein fibres, sheath material and connectors are delivered to a flat or ribbon cable manufacturing unit which is able to produce finished, measured and connector-equipped flat fibre cables having three or more optical fibres. It will be understood that instead of optical fibres, three or more electrical conductors may be arranged in a similar manner in a flat or ribbon cable for digital electrical signalling, for instance. Together with the accurate measurement of the fibres, or the conductors, the application of a majority decision in the transmission of the same information will afford a high degree of reliability and faultless signal transmission with a low bit error rate.

Figure 3:
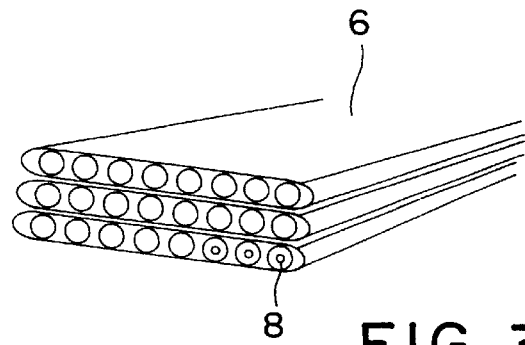
FIG. 3 illustrates mutually superimposed ribbon fibre cables or ribbon conductor cables according to the invention.
Figure 4:
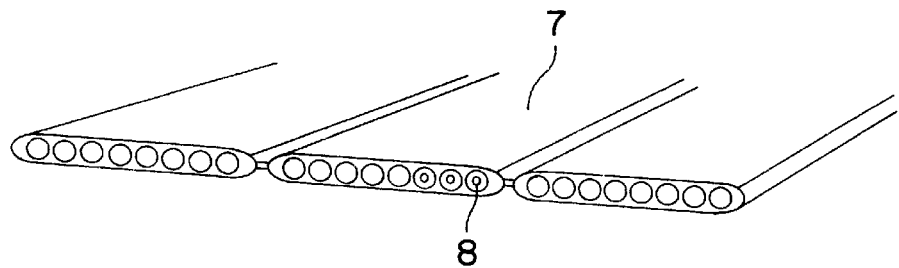
FIG. 4 illustrates triplets of ribbon fibre cables or ribbon conductor cables according to the invention placed in side-by-side relationship.

FIGS. 3 and 4 illustrate respectively flat cables having optical fibres or electric conductors and arranged in triplets, wherein the FIG. 3 illustration shows superimposed flat cables 6 while the FIG. 4 illustration shows the flat cables 7 arranged side-by-side in a horizontal plane, each flat cable including a plurality of optical fibres 8 or electric conductors. The various ribbons in the cables can be readily separated from one another and their individual fibres or conductors easily separated to enable connectors to be fitted thereto. The cables may be pre-manufactured with fibres/conductors of essentially the same lengths and with a greatest length deviation of ±1 cm so as to minimize skew, even in the case of multi-layer ribbon cables or ribbon cables disposed side-by-side in a horizontal plane.

Figure 5A:
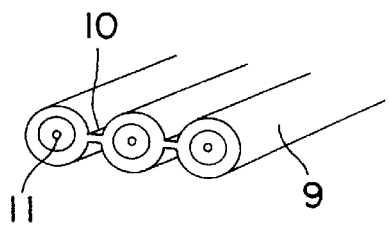
FIGS. 5A–C illustrate different insulated fibre assemblies or insulated conductor assemblies which form a cable according to the invention.
Figure 5B:
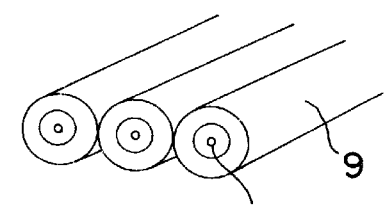
Figure 5C:
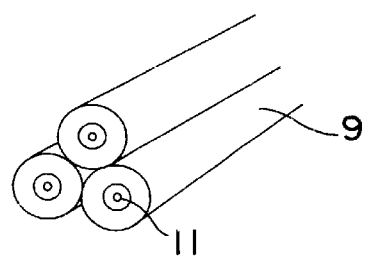

FIGS. 5A–C illustrate alternative forms of a three-fibre ribbon cable. FIG. 5A illustrates the fibre/conductor sheaths joined together by an intermediate piece of material 10, as opposed to the FIG. 5B illustration which laces such intermediate material. FIG. 5C shows the sheaths disposed in a triangular shape when seen in cross-section, with each sheath joined to two other sheaths 9. The cables illustrated in FIGS. 5A–C may be provided with outer protective coverings. Even in these cases, the mutually joined sheaths containing fibres/conductors 11 in ribbon form or in triangular cross-section form may be arranged or pre-manufactured with fibres/conductors of mutually the same lengths, where each fibre/conductor has an absolute length accuracy smaller than ±1 cm, to minimize the skew and be fitted with connectors.

We claim:

1. A method of minimizing skew in the ultra high-speed transmission of information, comprising the steps of:

fixating three or more conductors in a mutually parallel and spaced relationship so that any differences in lengths between the conductors does not exceed a greatest value such that a skew does not exceed a part of a bit slot when each of the conductors transmits substantially a same information;

transmitting simultaneously and in parallel the substantially the same information via each of said conductors; and taking a majority decision of the substantially the same information transmitted via each of said conductors to avoid a bit error.

2. The method according to claim 1, wherein the part of a bit slot is a tenth of a bit slot.

3. The method according to claim 1, the conductors being optical fibers.

4. A method for reducing skew associated with the transmission of information over a plurality of conductors comprising the steps of:

providing at least three conductors in a substantially fixed and parallel relationship;

establishing a length of each of said at least three conductors such that a time deviation between corresponding bits transmitted via each of said at least three conductors is less than a predetermined portion of a bit slot;

transmitting corresponding bits via each of said at least three conductors; and taking a majority decision of said corresponding bits transmitted via each of said conductors.

5. The method according to claim 4, wherein said predetermined portion is a tenth of a bit slot.

6. The method according to claim 4, the conductors being optical fibers.

7. A method of transmitting information comprising the steps of:

providing at least three conductors in a substantially fixed and parallel relationship;

establishing a length of each of said at least three conductors such that a time deviation between corresponding bits transmitted via each of said at least three conductors is reduced to less than a predetermined portion of a bit slot;

transmitting corresponding bits via each of said at least three conductors; and taking a majority decision of said corresponding bits, said reduced time deviation lessens an error associated with said majority decision.

8. The method according to claim 7, the conductors being optical fibers.

* * * * *